(12) United States Patent
Laine et al.

(10) Patent No.: US 12,497,024 B2
(45) Date of Patent: Dec. 16, 2025

(54) METHOD OF DETERMINING AN ALLOWABLE VEHICLE STATE SPACE FOR AN ARTICULATED VEHICLE

(71) Applicant: VOLVO TRUCK CORPORATION, Gothenburg (SE)

(72) Inventors: Leo Laine, Härryda (SE); Peter Nilsson, Hovås (SE); Mats Jonasson, Partille (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 20 days.

(21) Appl. No.: 17/594,319

(22) PCT Filed: Apr. 12, 2019

(86) PCT No.: PCT/EP2019/059530
§ 371 (c)(1),
(2) Date: Oct. 11, 2021

(87) PCT Pub. No.: WO2020/207602
PCT Pub. Date: Oct. 15, 2020

(65) Prior Publication Data
US 2022/0161782 A1  May 26, 2022

(51) Int. Cl.
*B60W 30/04* (2006.01)
*B60T 8/17* (2006.01)
(Continued)

(52) U.S. Cl.
CPC .......... *B60W 30/04* (2013.01); *B60T 8/1708* (2013.01); *B60T 8/17554* (2013.01);
(Continued)

(58) Field of Classification Search
None
See application file for complete search history.

(56) References Cited

U.S. PATENT DOCUMENTS 9,469,307 B2 * 10/2016 Solyom ............... B60W 10/20
9,862,413 B2 *  1/2018 Laine .................. B62D 13/06
(Continued)

FOREIGN PATENT DOCUMENTS

CN    102975768 A    3/2013
CN    103204163 A    7/2013
(Continued)

OTHER PUBLICATIONS

Japan Office Action dated Feb. 14, 2023 in corresponding Japan Patent Application No. 2021-559911, 13 pages.
(Continued)

*Primary Examiner* — Aniss Chad
*Assistant Examiner* — Christopher George Fees
(74) *Attorney, Agent, or Firm* — Jeffri A. Kaminski; Venable LLP (57) ABSTRACT

A method of determining an allowable vehicle state space of an articulated vehicle for safely completing a maneuver is provided. The method includes monitoring a drivable area ahead of the articulated vehicle, predicting a potentially swept area ahead of the articulated vehicle, wherein the potentially swept area represents an area that may be traversed by the articulated vehicle during the maneuver with a probability, based on an initial vehicle state of the articulated vehicle, a geometry of the articulated vehicle, and on error characteristics associated with one or more sensor input signals used for positioning the articulated vehicle, and determining the allowable vehicle state space such that the predicted potentially swept area does not extend beyond the drivable area ahead of the vehicle.

16 Claims, 7 Drawing Sheets

(51) Int. Cl.
  *B60T 8/1755* (2006.01)
  *B60W 50/00* (2006.01)
  *B60W 50/02* (2012.01)
  *B60W 50/14* (2020.01)

(52) U.S. Cl.
  CPC .... *B60W 50/0097* (2013.01); *B60W 50/0205* (2013.01); *B60W 50/14* (2013.01); *B60W 2050/0215* (2013.01); *B60W 2300/145* (2013.01); *B60W 2420/403* (2013.01); *B60W 2420/408* (2024.01); *B60W 2520/10* (2013.01); *B60W 2540/18* (2013.01); *B60W 2552/00* (2020.02); *B60W 2556/45* (2020.02)

(56) References Cited

U.S. PATENT DOCUMENTS

| | | | | |
|---|---|---|---|---|
| 11,235,757 | B2 * | 2/2022 | Tominaga | B60W 30/16 |
| 11,334,070 | B2 * | 5/2022 | Dean | G05D 1/0088 |
| 11,372,403 | B2 * | 6/2022 | Havens | G06F 17/11 |
| 11,372,416 | B2 * | 6/2022 | Shalev-Shwartz | G06V 10/84 |
| 11,511,745 | B2 * | 11/2022 | Graves | B60W 30/16 |
| 11,573,090 | B2 * | 2/2023 | Rosenblum | B60W 10/20 |
| 11,604,470 | B2 * | 3/2023 | Nister | G05D 1/0278 |
| 2004/0181338 | A1 * | 9/2004 | Dobler | G08G 1/166 |
| | | | | 701/1 |
| 2009/0093924 | A1 * | 4/2009 | Aso | B60W 40/10 |
| | | | | 701/31.4 |
| 2010/0106356 | A1 | 4/2010 | Trepagnier et al. | |
| 2012/0089294 | A1 | 4/2012 | Fehse et al. | |
| 2014/0297128 | A1 * | 10/2014 | Lavoie | B60W 30/18036 |
| | | | | 701/41 |
| 2016/0114831 | A1 | 4/2016 | Laine | |
| 2016/0223350 | A1 * | 8/2016 | Lewis | G08G 1/096775 |
| 2016/0251005 | A1 * | 9/2016 | Morselli | B60T 8/17 |
| | | | | 701/50 |
| 2016/0318493 | A1 * | 11/2016 | Drako | B60T 8/248 |
| 2017/0060810 | A1 * | 3/2017 | Preston | G06F 30/15 |
| 2018/0170369 | A1 * | 6/2018 | Mitchell | B62D 1/02 |
| 2018/0181133 | A1 * | 6/2018 | Zhang | G05D 1/0217 |
| 2018/0224851 | A1 * | 8/2018 | Park | G05D 1/0272 |
| 2018/0304884 | A1 * | 10/2018 | Jundt | B60W 30/04 |
| 2018/0372875 | A1 * | 12/2018 | Juelsgaard | G01S 17/931 |
| 2020/0001920 | A1 * | 1/2020 | Hejase | B60W 30/18036 |
| 2021/0191406 | A1 * | 6/2021 | Shalev-Shwartz | G06V 20/584 |
| 2021/0247782 | A1 * | 8/2021 | McEwan | G05D 1/0825 |

FOREIGN PATENT DOCUMENTS

| | | | | |
|---|---|---|---|---|
| EP | 2029414 | A2 | 3/2009 | |
| JP | 2004530997 | A | 10/2004 | |
| JP | 2007331715 | A | 12/2007 | |
| JP | 5614055 | B2 | 10/2014 | |
| KR | 20180091357 | A | 8/2018 | |
| SE | 539796 | C2 * | 12/2017 | B60W 40/06 |

OTHER PUBLICATIONS

International Search Report and Written Opinion dated Jan. 22, 2020 in corresponding International PCT Application No. PCT/EP2019/059530, 10 pages.
International Preliminary Report on Patentability dated Jul. 19, 2021 in corresponding International PCT Application No. PCT/EP2019/059530, 12 pages.
Janpanese Office Action dated Aug. 10, 2023 in corresponding Japanese Patent Application 2021-559911, 6 pages.
Japanese Notice of Allowance dated Dec. 14, 2023 in corresponding Japanese Patent Application No. 2021-559911, 2 pages.
Chinese Office Action dated Jan. 18, 2024 in corresponding Chinese Patent Application No. 201980095281.4, 17 pages.
Korean Office Action dated Jan. 23, 2024 in corresponding Korean Patent Application No. 10-2021-7033926, 20 pages.

* cited by examiner

METHOD OF DETERMINING AN ALLOWABLE VEHICLE STATE SPACE FOR AN ARTICULATED VEHICLE

CROSS-REFERENCE TO RELATED APPLICATIONS

This application is a U.S. National Stage application of PCT/EP2019/059530, filed Apr. 12, 2019, and published on Oct. 15, 2020, as WO 2020/207602 A1, all of which is hereby incorporated by reference in its entirety.

TECHNICAL FIELD

The present disclosure relates to methods, control units, and vehicles for determining allowable vehicle state spaces, e.g., velocity limits, for articulated vehicles, such as trucks and semi-trailers.

The invention can be applied in heavy-duty vehicles, such as trucks and construction equipment. Although the invention will be described mainly with respect to a semi-trailer vehicle, the invention is not restricted to this particular vehicle, but may also be used in other types of articulated vehicles such as in recreational vehicles.

BACKGROUND

Autonomous and semi-autonomous vehicles use various types of sensor input signals for navigation and vehicle control. Advanced driver assistance systems (ADAS) are also based on sensor input signals. If certain key sensor signals are lost which are necessary for safe operation of the vehicle, a safe stop maneuver is likely required. Safe stop maneuvers may comprise, e.g., maneuvering the vehicle to the side of the road and stopping the vehicle in a controlled manner. Since the vehicle may be at least partly 'blind' during the safe stop maneuver, control must sometimes be executed based on alternative input signals. One such alternative input signal is dead reckoning where wheel revolution is used to estimate, e.g., travelled distance, velocity, and acceleration.

US 2018/0224851 A1 relates to the problem of executing a safe stop maneuver in case a GPS signal is lost. A position estimate based on dead reckoning is used in case the primary positioning system is malfunctioning.

US 2010/0106356 relates to autonomous vehicle control and to sensor systems for autonomous vehicle control. Part of the disclosure relate to loss of sensor input. For instance, there is disclosed a mechanism which simulates obstacle position in case radar signal is lost due to blockage. The disclosure also relates to executing a safe stop maneuver in case safe operation cannot be guaranteed.

A problem related to executing safe stop maneuvers is that the vehicle may be in a state which does not allow execution of a stop maneuver in a safe manner. The vehicle may for instance be travelling too fast.

Other maneuvers which require abrupt and critical vehicle control comprise sudden obstacle avoidance maneuvers, maneuvering to account for skidding, and the like. Similar to the safe stop maneuver, the vehicle may be in a state which does not allow execution of, e.g., skidding compensation in a safe manner, due to having a too high velocity.

There is a need for methods of determining allowable vehicle state spaces of articulated vehicle such that safe stop maneuvers can always be safely executed in case of sensor signal outage.

SUMMARY

It is an object of the present disclosure to provide techniques which alleviate or overcome the above mentioned problems. This object is at least in part obtained by a method of determining an allowable vehicle state space of an articulated vehicle for safely completing a maneuver, wherein the vehicle state space comprises vehicle velocity. The method comprises monitoring a drivable area ahead of the articulated vehicle. The method also comprises predicting a potentially swept area ahead of the articulated vehicle. The potentially swept area represents an area potentially traversed by the articulated vehicle during the maneuver with a probability. It is determined based on an initial vehicle state, a geometry of the articulated vehicle, and on error characteristics associated with one or more sensor input signals used for positioning the vehicle. The method also comprises determining the allowable vehicle state space such that the predicted potentially swept area during the maneuver does not extend beyond the drivable area ahead of the vehicle.

This way it is ensured that the maneuver can be executed safely given current driving scenario. For instance, some scenarios may allow for a relatively high driving speed while others present a higher control challenge and will thus lead to reduced vehicle speed. The geometry of the articulated vehicle is accounted for when determining the potentially swept area, this way it is ensured that, e.g., the trailer does not exit the drivable area during the maneuver. Different types of sensor error characteristics are accounted for by the method, which is an advantage since it cannot be known before-hand which sensor systems that will experience outage.

According to aspects, the maneuver is a safe stop maneuver, and the one or more sensor signals correspond to a reduced set of sensor input signals compared to a normal mode of operation. The possibility to execute safe stop maneuvers is crucial for, e.g., autonomous drive vehicles and for more advanced driver support systems.

According to aspects, the monitoring comprises obtaining information related to a traffic infrastructure ahead of the vehicle. Information about the traffic infrastructure can be obtained in a number of different ways, which will be explain in detail below. This provides for a robust system, which is an advantage. For instance, optionally, the monitoring comprises obtaining data related to an environment ahead of the vehicle from any of; one or more radar sensors, one or more lidar sensors, one or more vision sensors, and one or more V2X communication transceivers.

According to aspects, the predicting comprises predicting the potentially swept area ahead of the articulated vehicle based on a planned track of the vehicle for the maneuver. The planned track can be maintained and updated as the vehicle traverses the traffic infrastructure. By basing the potentially swept area on a current planned maneuver track, a more accurate estimate of the potentially swept area is obtained. Also, advantageously, since the area swept by an articulated vehicle may depend on the vehicle velocity and turn rate during the maneuver, the allowable vehicle state space optionally comprises both upper and lower limits on vehicle velocity during the duration of the maneuver.

According to aspects, the predicting comprises obtaining an estimate of an initial vehicle state error associated with the vehicle. The state error has an impact on the determined potentially swept area. Thus, advantageously, a more accurate estimate of the potentially swept area is obtained.

According to aspects, the predicting comprises estimating a covariance matrix associated with a positioning error of the vehicle during the maneuver. The covariance matrix offers an efficient means of low complexity for representing an uncertainty region, which is an advantage.

According to some aspects, the vehicle state space comprises steering wheel angle, and the method comprises determining the allowable vehicle state space also based on a risk of roll-over associated with the planned track of the vehicle for the maneuver. Thus, the method not only limits the risk of the articulated vehicle sweeping outside of the drivable area, but also limits the risk of tip-over during the maneuver.

According to some such aspects, the method comprises obtaining one or more dynamic properties associated with the vehicle, and the determining of the allowable vehicle state space is also based on the vehicle dynamic properties. This way different vehicle dynamic properties are accounted for by the method, leading to a more precise control during the maneuver. For instance, top-heavy vehicles may be more strictly limited in terms of steering wheel angle compared to more stable vehicles.

According to aspects, the method comprises providing the determined allowable vehicle state space as an output to a control unit of the vehicle for control during the maneuver. Thus, advantageously, vehicle control can be improved based on the new input from the disclosed methods.

According to aspects, the method comprises providing an estimate of the potentially swept area and/or a likelihood of roll-over during the maneuver as an output to a control unit of the vehicle for control during the maneuver. Again, advantageously, vehicle control by the control unit can be improved based on the new input from the disclosed methods.

According to aspects, the method comprises determining a plurality of potentially swept areas corresponding to different sets of sensor input signal combinations. Different scenarios and conditions yield different potentially swept areas. For instance, certain combinations of available sensor signal may yield a smaller potentially swept area compared to other less accurate sensor signals. The method can be used for maintaining a number of different failure hypotheses with associated probabilities, and thus generate input for more advanced safety systems in the articulated vehicle.

According to aspects, the method comprises triggering a warning signal based on an estimated uncertainty associated with an estimated state of the articulated vehicle. Some scenarios and potentially swept areas may be associated with, e.g., a significant risk that the maneuver cannot be completed safely. In such cases the vehicle can be prepared for collision or other critical event. The warning signal may, e.g., be a warning signal issued to a control unit in the articulated vehicle, and/or a warning signal issued via V2X communication to nearby vehicles and infrastructure objects.

There is also disclosed herein control units, computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1:
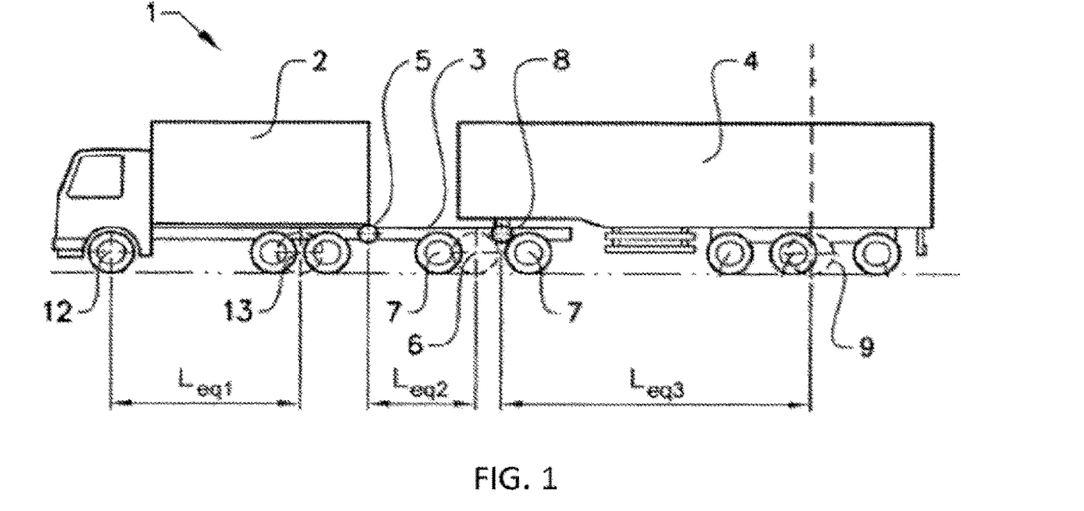
FIG. 1 schematically illustrates a vehicle for cargo transport.

FIG. 1 shows a schematic articulated vehicle combination 1 comprising a towing vehicle 2 and two towed vehicles 3, 4. The towing vehicle may be a regular truck adapted for commercial highway use or a tractor having a fifth wheel but may also be an off-road truck, a bus, or a recreational vehicle. The first towed vehicle or trailer 3 is in the shown example a dolly having a drawbar connected to the trailer coupling of the truck. The dolly is provided with two wheel-axles 7. The second towed vehicle or trailer 4 is a semitrailer, which is provided with a kingpin 8 that is connected to the fifth wheel of the dolly. This example shows a common type of a longer vehicle combination, but it is also possible to use other types of vehicle combinations having other types of towing vehicles and other types and numbers of towed vehicles. Different vehicle combinations may include a truck with a regular trailer, a truck with a center axle trailer, a truck with a dolly and a semitrailer, a tractor with a semitrailer, a tractor with a B-link and a semitrailer, a tractor with a semitrailer and a regular trailer or a tractor with a semitrailer dolly and a semitrailer.

The towing vehicle may be provided with various autonomous or semi-autonomous driving functions such as an automatic reverse assistance function, in which the steering of the vehicle combination is automated during reversing and where the speed of the vehicle combination may be controlled by the driver.

In the shown vehicle combination, the effective wheel base Leq1 of the towing vehicle, i.e. the truck, is the length from the front axle 12 to the virtual axle 13 of the truck. The effective wheel base Leq2 of the first towed vehicle, i.e. the dolly, is the length from the drawbar connection to the virtual axle 6 of the dolly. The effective wheel base Leq3 of the second towed trailer extends from the king pin 8 to the to the virtual rear axle 9 of the trailer 4.

Based on the vehicle geometry and travelled path, a swept area can be determined. The swept area represents an area traversed by the articulated vehicle as it moves over a drivable area. For instance, when the towing truck turns along a path, the trailers move along slightly different paths. Details and examples on the determining of swept areas for different types of vehicle configurations are disclosed in U.S. Pat. No. 9,862,413 B2 and will therefore not be discussed in more detail herein.

Figure 2:
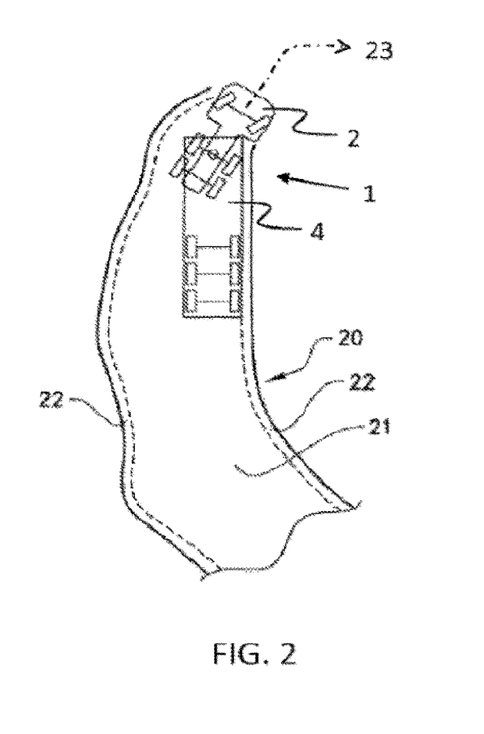
FIG. 2 illustrates a vehicle with a swept area.

FIG. 2 shows an articulated vehicle 1 with a modified swept area 20 for the last part of a travelled path 23. In FIG. 2, the modified swept area 20 is comprised of the swept area 21 and of tolerance bands 22, one on each side of the swept area 21. The purpose of the tolerance band is to compensate for errors in the steering actuator and for tolerances and noise in the measured values from different sensors.

Autonomous and semi-autonomous articulated vehicles rely on sensor signal input in order to control the vehicle, with or without a driver. Sensor systems arranged on vehicles for supporting autonomous functions may comprise any of; radio detection and ranging (radar) sensors, light detection and ranging (lidar) sensors, vision-based sensors such as cameras, and global positioning system (GPS) receivers. These sensors monitor the vehicle surroundings in order to detect obstacles and to ascertain, e.g., the geometry of the drivable area ahead of the vehicle. Vehicles may also comprise a number of on-board sensors, such as steering angle sensor, articulation angle sensor, i.e., a sensor which measures the angle between towing truck and trailer, wheel speed sensors, and inertial measurement units (IMU).

A critical situation may result in case a vehicle loses sensor input from one or more sensor systems. For instance, radar and lidar data sensors may break down, or processing units responsible for processing sensor signal data may experience outage. If critical sensor signals are lost, or some critical operation is otherwise hampered, an automatic maneuver such as a safe stop maneuver may be necessary. This maneuver can then be executed based on control using on-board sensor systems. I.e., dead reckoning using wheel speed and perhaps also steering wheel angle sensors.

However, such a maneuver may not be possible to execute in a safe manner in case, e.g., vehicle velocity is too high. Also, during the maneuver the vehicle state may need to be constrained in order to prevent vehicle tip-over or skidding.

To provide solutions to these problems, it is herein proposed to continuously monitor a drivable area ahead of the articulated vehicle, i.e., to always have an idea of what the road looks like where the articulated vehicle is heading. It is then proposed to predict a potentially swept area ahead of the articulated vehicle. This potentially swept area represents an area which may be traversed by the articulated vehicle during an upcoming maneuver depending on sensor error and the like. The potentially swept area can, as will be explained in the following, be determined based on an initial vehicle state, a geometry of the articulated vehicle, and on error characteristics associated with one or more sensor input signals used for positioning the vehicle. Given the drivable area and potentially swept area, it is possible to determine an allowable vehicle state space such that the predicted potentially swept area does not extend beyond the drivable area ahead of the vehicle, and such that the maneuver can be completed successfully with sufficiently high probability.

Herein, a drivable area is an area where the vehicle may be located without risk of vehicle damage or driver injury. The road itself is of course a drivable area. However, depending on circumstances, the road shoulder may be comprised in the drivable area, and areas to the side of the road may also be comprised in the drivable area depending on circumstances and type of vehicle. For instance, if a relatively flat field extends to the side of the road without a ditch in-between, then the flat field may be deemed as a drivable area, since an articulated vehicle can be temporarily driven onto the field without significant risk of damaging the vehicle or vehicle occupant. An off-road vehicle like a dumper truck or the like is likely associated with a larger drivable area than a normal cargo transport vehicle.

A vehicle state is a collection of variables which together describe in what state the vehicle is currently in. Herein, vehicle state comprises variables associated with vehicle location (coordinates) and orientation (such as, e.g., heading, steering angle and articulation angle). The vehicle state also comprises information associated with vehicle dynamic state, i.e., vehicle velocity, acceleration, turn rate, and so on. The vehicle state is often represented as a vector of state variables. As will be discussed in more detail below, the allowable vehicle state space may, in general, comprise both upper and lower limits on state variables such as velocity during the duration of the maneuver. Also, some state variables will have different limits depending on other variables. For instance, velocity in some directions may have different limits compared to velocity in other directions.

A state space is an N-dimensional space which represents ranges of vehicle states. Physics limits the state space depending on type of vehicle, e.g., by a maximum attainable velocity. A control unit may impose further constraints on the state space, thereby limiting the vehicle state space to some ranges of values.

The vehicle state can be estimated by a vehicle state estimate. This vehicle state estimate is associated with a vehicle state uncertainty which describes the accuracy in the vehicle state estimate. A perfect state estimate agrees totally with the 'true' vehicle state, while a more realistic vehicle state estimate will differ compared to the true state according to some error distribution. A common way to represent vehicle state uncertainty is by a covariance matrix representing expected error variation.

A potentially swept area is a statistically determined area which is associated with some level of confidence. This level of confidence can be determined depending on circumstances, and on the type of maneuver. The potentially swept area, and some examples of how to determine the potentially swept area will be given below. However, for example, the area may correspond to an estimated area which bounds the swept area by the articulated vehicle during the maneuver with some probability, e.g., 99.999%.

The size of the potentially swept area depends on some key factors. One such key factor is the initial velocity of the articulated vehicle when the maneuver is started. For instance, when a safe stop maneuver is initiated. This is at least in part because the vehicle initial velocity determines how long time it will take to stop the vehicle given a target velocity profile to be followed during the maneuver, and at least in part due to that some errors, such as steering wheel angle error, will be amplified by velocity.

Another key factor is the actual target velocity profile during the maneuver, i.e., the planned velocity for the different parts of the maneuver track. This is because the trailer behaves differently with respect to swept area at different velocities. As a consequence, different velocity profiles may yield different swept areas even if the planned track path stays the same.

Figure 3:
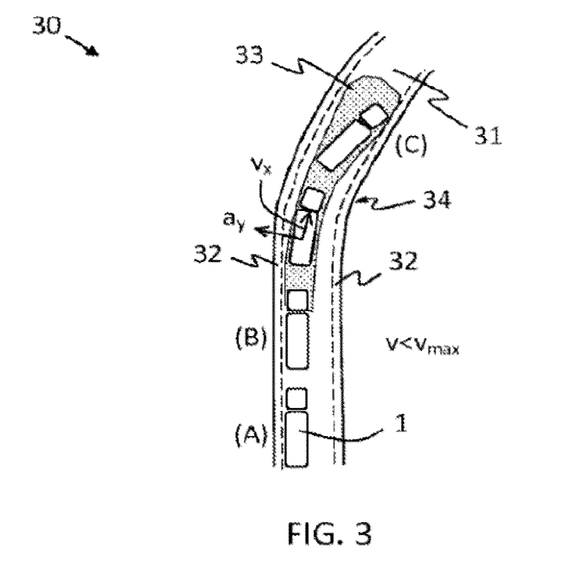
FIGS. 3-4 schematically illustrate potentially swept areas during a maneuver.

Vehicle velocity impacts swept area in different ways depending both on the followed track path, and the target speed profile during the maneuver. For a slow moving articulated vehicle 1, the trailer 3, 4 will cut inwards for a constant radius turn as discussed in U.S. Pat. No. 9,862,413 B2, thereby expanding the swept area inwards, i.e., towards the center of a circle segment representing the turn. For a faster moving articulated vehicle, the lateral or centripetal acceleration, given by $a_y=v_x^2/R$, for a longitudinal velocity $v_x$ and a constant turn radius R may be strong enough to cause skidding of the trailer, which effect then instead expands the swept area outwards, i.e., away from the center of a circle segment representing the turn. The lateral acceleration $a_y$ and longitudinal velocity $v_x$ are schematically indicated in FIG. 3.

For an articulated vehicle 1 which does not execute a turn or where R is very large (and where the vehicle does not suffer a jack-knifing event), the swept area will not be expanded beyond the area covered by the towing vehicle, since the trailer will follow the same track as the towing vehicle.

The area which is swept by an articulated vehicle 1 therefore normally increases at low velocity, i.e., a slow moving articulated vehicle may actually sweep a larger area compared to the same articulated vehicle moving at higher velocity. The swept area is at a minimum for some 'ideal' or 'optimal' velocity, and then increases again for sufficiently high velocities where skidding occurs due to the increased centripetal acceleration. Consequently, according to some aspects, the allowable vehicle state space may comprise both upper and lower limits on vehicle velocity for at least these reasons. The upper and lower limits on vehicle velocity may furthermore be dependent on vehicle heading and also on road friction conditions and the like.

To summarize, for slow moving articulated vehicles, the trailer will cut inwards during a constant radius turn. At some 'break-even' velocity the trailer will start to track in the same path as the towing vehicle, say around when the lateral acceleration reaches about $a_y=0.25$ G m/s$^2$ for a given curve radius R. If the longitudinal velocity is increased above the break-even velocity, the swept path of the trailer will instead be outwards of the truck part path due to the lateral acceleration.

These different states (swept area inwards, swept area outwards, trailer tracks the towing vehicle) might all occur during different parts of a maneuver, such as a safe stop maneuver. Consequently, it is important to verify that, e.g., the swept path at low speed towards the end of the maneuver with inward trailer tracking can be accommodated in the drivable area.

Also, depending on the maneuver, the vehicle initial state when starting the maneuver may not allow for following a planned track, in which case the potentially swept area will extend outside of the planned track. The geometry of the articulated vehicle also determines the potentially swept area, at least due to that the vehicle geometry influences the sweep characteristics of the towing truck and trailer combination, as was explained in detail in U.S. Pat. No. 9,862,413 B2. Finally, sensor error characteristics influence the spatial extension of the potentially swept area. This is because sensor error determines uncertainty in the vehicle state estimate during the maneuver. In case perfect sensor information is available which directly gives vehicle true state without error, then the potentially swept area will exactly follow the planned track, at least in case it is physically possible to control the vehicle to follow the track. If sensor input signals are associated with some measurement or detection error, then the error characteristics or statistical distribution of sensor error will influence the potentially swept area. A large sensor signal error is likely to give rise to a larger potentially swept area compared to a more accurate sensor signal.

FIG. 3 schematically illustrates an example scenario 30 where an articulated vehicle 1 executes a maneuver from (A) via (B) to (C). The articulated vehicle 1 is travelling on a road 34 associated with a drivable area 31. This drivable area may comprise, e.g., a road shoulder depending on type of maneuver, vehicle and other circumstances. There may also be a margin 32 to account for inaccuracies in the determining of the drivable area, e.g., to account for errors in map data and the like. The vehicle 1 monitors the drivable area 31 ahead of the vehicle, and also estimates the potentially swept area for the given maneuver, e.g., a safe stop maneuver. The potentially swept area 33 which is estimated at location (B) is indicated in FIG. 3. This estimated potentially swept area is comprised within the drivable area, hence the vehicle state at location (B) is such as to allow for the execution of the maneuver in a safe manner. For instance, vehicle velocity v is at an acceptable level below a maximum allowable velocity $v_{max}$.

Notably, the potentially swept area includes effects due to the above mentioned sweep by a towed vehicle as it is pulled by a towing vehicle.

Figure 4:
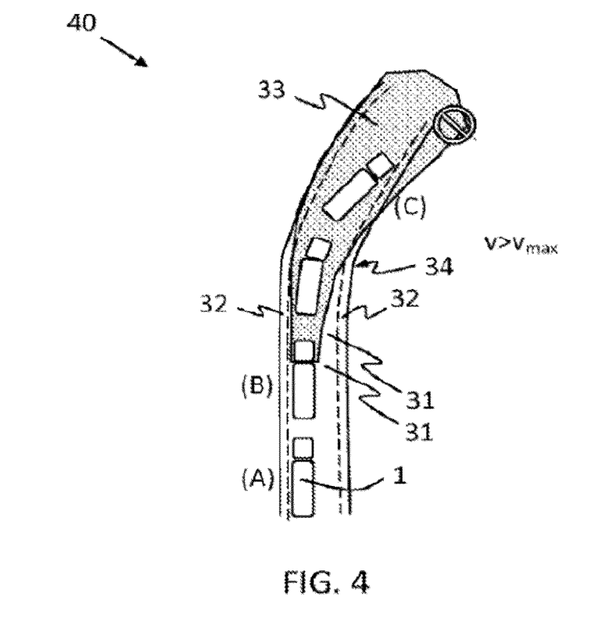

FIG. 4 schematically illustrates another example scenario 40, where the same articulated vehicle 1 is travelling on the same road 34, but now with a higher velocity v. At the same location (B), the potentially swept area 33 is estimated and found to extend beyond the drivable area 31. This means that, should e.g. sensor outage be experienced at location (B), then a safe stop maneuver cannot be completed in a safe manner since there is a risk that the articulated vehicle may drive off the road.

Thus, by estimating a potentially swept area and comparing it to a corresponding monitored drivable area, the vehicle state can be constrained to lie within an allowable vehicle state space which permits a given maneuver. For example, the vehicle velocity can be limited to velocities below a maximum allowable velocity for allowing an immediate execution of a safe stop maneuver in case of, e.g., sensor outage or the like.

In addition, optionally, the vehicle state space during the maneuver can be constrained to lie within an allowable state space. This may, e.g., comprise limiting a steering wheel angle during the maneuver to reduce risk of vehicle tip-over or skidding.

To summarize, FIGS. 3 and 4 illustrate examples of a method of determining an allowable vehicle state space of an articulated vehicle 1 for safely completing a maneuver. As mentioned above, the maneuver may be a safe stop maneuver, or an emergency brake maneuver, or an obstacle avoidance maneuver, or the like. The method is especially advantageous for controlling vehicles to handle situations where a reduced set of sensor input signals is available compared to a normal mode of operation, i.e. in situations associated with sensor signal outage or sensor signal processing outage.

The vehicle state space comprises limits on vehicle velocity. This vehicle velocity may be a vehicle velocity in terms of absolute value velocity without direction, or it may be a velocity vector in two or three dimensions. It is appreciated that some scenarios may limit velocity differently depending on vehicle heading; some headings may be limited more strongly than others.

As illustrated in FIGS. 3 and 4, the method comprises monitoring a drivable area 33 ahead of the articulated vehicle 1.

According to some aspects, this monitoring comprises obtaining information related to a traffic infrastructure ahead of the vehicle 1. This information may be obtained from map data or from vehicle data storage. Information can also optionally be obtained from any of; one or more radar sensors, one or more lidar sensors, one or more vision sensors, and one or more V2X communication transceivers.

As discussed above, the method also comprises predicting a potentially swept area 33 ahead of the articulated vehicle 1. The potentially swept area 33 represents an area which is potentially swept by the articulated vehicle 1 during the maneuver. The potentially swept area may, e.g., be represented by a polygon or other geometrical constructions which can be used to define an area. It is appreciated that the potentially swept area is an area where the articulated vehicle may be located with some probability of confidence interval. Therefore, according to some aspects, the method also comprises configuring a confidence interval or probability associated with the potentially swept area.

The prediction of potentially swept area is based on an initial vehicle state, a geometry of the articulated vehicle 1, and on error characteristics associated with one or more sensor input signals used for positioning the vehicle 1. The vehicle initial state comprises vehicle velocity and other state variables describing the vehicle state. Generally, the higher the vehicle velocity the larger the potentially swept area. For instance, the higher the velocity the longer it usually takes to stop the vehicle, which means that the vehicle maneuver takes longer time to complete. The geometry of the vehicle influences the swept area as was discussed above in connection with FIGS. 1 and 2. The error characteristics associated with the one or more sensor input signals also affect the potentially swept area. In general, uncertain sensor input signal data, i.e., sensor input signal data associated with large errors, give more uncertainty and therefore also a larger potentially swept area. More accurate sensor input signals on the other hand often result in a smaller potentially swept area.

According to some aspects, the predicting comprises predicting the potentially swept area 33 ahead of the articulated vehicle 1 based on a planned track 23 of the vehicle 1 for the maneuver. For example, an unbiased control algorithm can often be assumed which follows the planned track for the maneuver in question with some error which is evenly distributed around the planned track 23, such as a Gaussian or normal error distribution with some covariance matrix. The potentially swept area then extends on either side of the planned track 23 with an extension magnitude determined by the Gaussian error covariance matrix, and on a confidence interval parameter which determines the probability with which the articulated vehicle is located within the potentially swept area.

The method also comprises determining the allowable vehicle state space such that the predicted potentially swept area 33 does not extend beyond the drivable area 31 ahead of the vehicle 1. Consequently, as long as the vehicle state is kept within the limits of the allowable vehicle state space, the maneuver can be executed without significant risk that the vehicle leaves the drivable area.

Figure 5A:
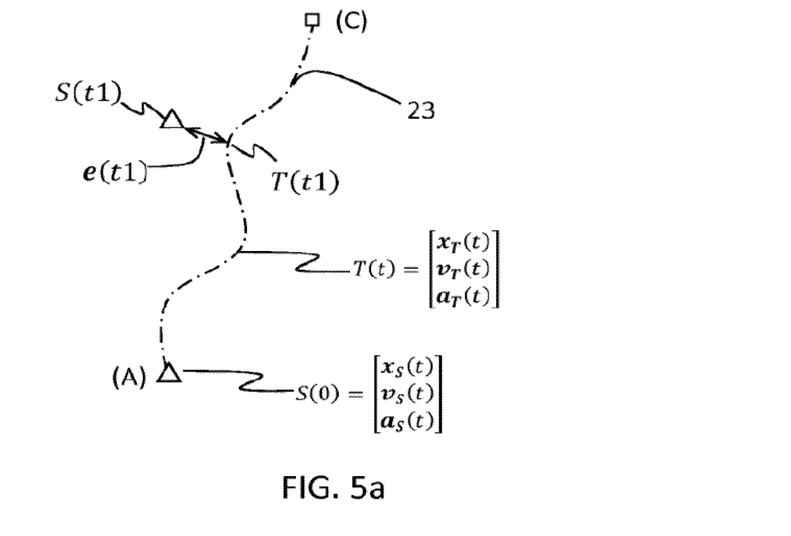
FIGS. 5-7 show examples of determining a potentially swept area.

With reference to FIG. 5a, in general, a planned track from a starting location (A) to a target location (C) such as the track 23 can be represented by a matrix of state vectors T indexed by time t;

$$T(t) = \begin{bmatrix} x_T(t) \\ v_T(t) \\ a_T(t) \end{bmatrix},$$

where $x_T(t)$ denotes position vector, $v_T(t)$ denotes velocity vector, and $a_T(t)$ denotes acceleration vector as function of time t. The planned track may also comprise other quantities such as steering wheel angle, turn rate, heading, and so on. An error vector at time t can be defined as a difference between a vehicle state vector $$S(t) = \begin{bmatrix} x_S(t) \\ v_S(t) \\ a_S(t) \end{bmatrix}$$

at time t and the corresponding planned track matrix at time t;

$$e(t) = \begin{bmatrix} x_S(t) \\ v_S(t) \\ a_S(t) \end{bmatrix} - \begin{bmatrix} x_T(t) \\ v_T(t) \\ a_T(t) \end{bmatrix}.$$

A control algorithm for executing a maneuver where the articulated vehicle follows the planned track T(t) can be based on minimizing, e.g., a squared error $e(t)^T e(t)$. Such control algorithms can be based on a plurality of known tracking filter methods, such as Kalman filters, extended Kalman filters, Wiener filters, and variants of a particle filter. The potentially swept area, according to one interpretation, models the error which one of these algorithms may exhibit if it is used to execute the planned maneuver, i.e., to follow the planned track 23.

It is appreciated that the different components in the matrix of state vectors T can be given different priorities or weights when deciding on actions and control decisions. For instance, lateral position may be more important than, e.g., longitudinal stopping distance, when planning a maneuver.

Note that, since the planned track T optionally comprises more variables than simply location, the maneuver must also follow a velocity profile and an acceleration profile of the planned track. Thus, an articulated vehicle which is located exactly on the track coordinates at time t1 may still be associated with a large error if the acceleration of velocity of the articulated vehicle is not in agreement with the planned track T.

The planned track T may of course also comprise only a spatial track, $T(t)=x_T(t)$, or a spatial track and a velocity profile, $$T(t) = \begin{bmatrix} x_T(t) \\ v_T(t) \end{bmatrix}.$$

The initial vehicle state S(0) at time t=0 and its estimated value Ŝ(0) which will be associated with an error is also likely to influence the size and shape of the potentially swept area 33. For instance, an uncertain starting point is more likely to generate a large potentially swept area compared to a more certain starting point for the articulated vehicle 1. The initial vehicle state may comprise any number of state variables, such as position in two or three dimensions, velocity vector, acceleration vector, vehicle heading, and vehicle turn rate. Each of the state variables may be associated with an error or an uncertainty having error characteristics described by some statistical distribution.

Figure 5B:
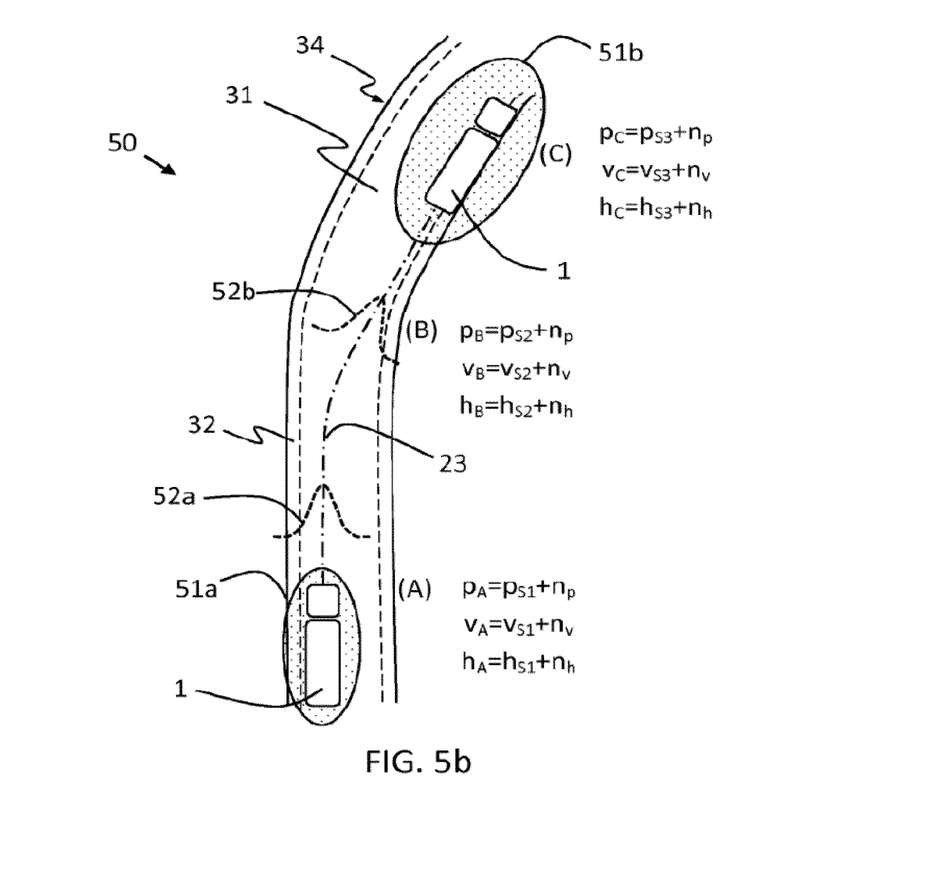

An example with normally distributed errors, also sometimes referred to as Gaussian errors, is illustrated in FIG. 5b, which shows an example scenario 50 where vehicle state error in terms of at least position is assumed to be unbiased with respect to the planned track 23 and to follow a Gaussian distribution centered around the track. The articulated vehicle 1 is at location (A) associated with true position $p_{s1}$, true velocity vector $v_{S1}$, and true heading vector $h_{S1}$. An estimated state vector $S=[p_A, v_A, h_A]$ has associated Gaussian or normally distributed errors $[n_p, n_v, n_h]$. The uncertainty in the estimated state vector is described by a covariance matrix associated with the error variables. For the position estimate, this covariance matrix can be illustrated by an ellipse 51a which indicates where the true value lies with some probability. For instance, for a Gaussian distribution with mean u, the probability that a realization lies within one standard deviation of the mean value u is about 68.27%, the probability that a realization lies within two standard deviations of the mean value u is about 95.45%, and the probability that a realization lies within three standard deviations of the mean value u is about 99.73%.

In case of sensor signal outage, no accurate sensor signal is available, which implies that the uncertainty can be expected to grow with time. Thus, error distribution 52b, which describes the error $n_p$ at location (B) is likely larger than error distribution 52a, and the uncertainty ellipse 51b covers a larger area compared to the uncertainty ellipse 51a.

The determining of potentially swept area will be discussed in more detail below in connection to FIGS. 7a and 7b.

Figure 7A:
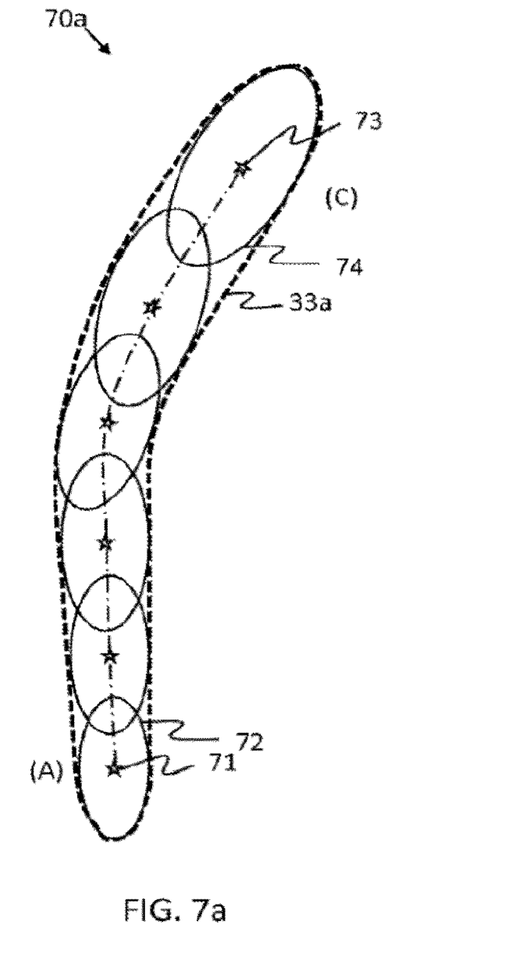

FIG. 7a shows one example 70a of determining the potentially swept area based on covariance matrix estimates of a filter such as a Kalman filter. FIG. 7a illustrates a sequence of uncertainty ellipsoids 72, 74, also sometimes referred to in the literature as confidence regions. In statistics, a confidence region is a multi-dimensional generalization of a confidence interval. It is a set of points in an n-dimensional space, often represented as an ellipsoid around a point which is an estimated solution to a problem, although other shapes can occur. The confidence region is calculated in such a way that if a set of measurements were repeated many times and a confidence region calculated in the same way on each set of measurements, then a certain percentage of the time (e.g. 95%) the confidence region would include the point representing the "true" values of the set of variables being estimated. Determining uncertainty ellipsoids, or confidence regions is known and will not be discussed in detail here.

The covariance matrix estimate $P_{k|k}$ in a Kalman filter algorithm at sample k (or, equivalently, at discrete time index k) given data input up to time k is determined as $P_{k|k} = (I-K_k H_k) P_{k|k-1} (I-K_k H_k)^T + K_k R_k K_k^T$, where $P_{k|k-1} = F_k P_{k-1|k-1} F_k^T + Q_k$, and where $P_{k|k-1}$ is the covariance matrix estimate at time k given data up to time k−1, I is the identity matrix, $K_k$ is the Kalman gain at time step k, $H_k$ is the observation matrix at time step k, $R_k$ is the assumed covariance matrix of the measurement noise, i.e., describing the uncertainty in the input sensor signals, $F_k$ is a state transition matrix at time step k, and $Q_k$ is a process noise at time step k.

Note that the estimate of covariance matrix $P_{k|k}$ does not depend on the actual realization of sensor data, only on the assumed statistics of the error distributions and processes. Thus, the uncertainty ellipsoids 72, 74 can be determined by simply iterating the above equations.

The sequence of uncertainty ellipsoids in FIG. 7a is determined starting in an initial vehicle state 71 with associated uncertainty ellipsoid 72 determined from $P_{0|0}$ at location (A) up to and end location (C) of the planned track 23 associated with a vehicle state 73 and associated uncertainty ellipsoid 74. The potentially swept area can now be determined as a bounding region 33a which bounds the error ellipsoids, or simply as the union of the uncertainty ellipsoid regions.

Accounting for articulated vehicle sweep can be done in many ways, for instance by expanding the region given by the uncertainty ellipsoids by a fixed amount, or by considering a tractor vehicle driving along the boundary of the region as determined from the uncertainty ellipsoids. The articulated vehicle geometry can then be used to determine the swept area based on the tracks of the towing vehicle, as described in U.S. Pat. No. 9,862,413 B2.

Figure 6:
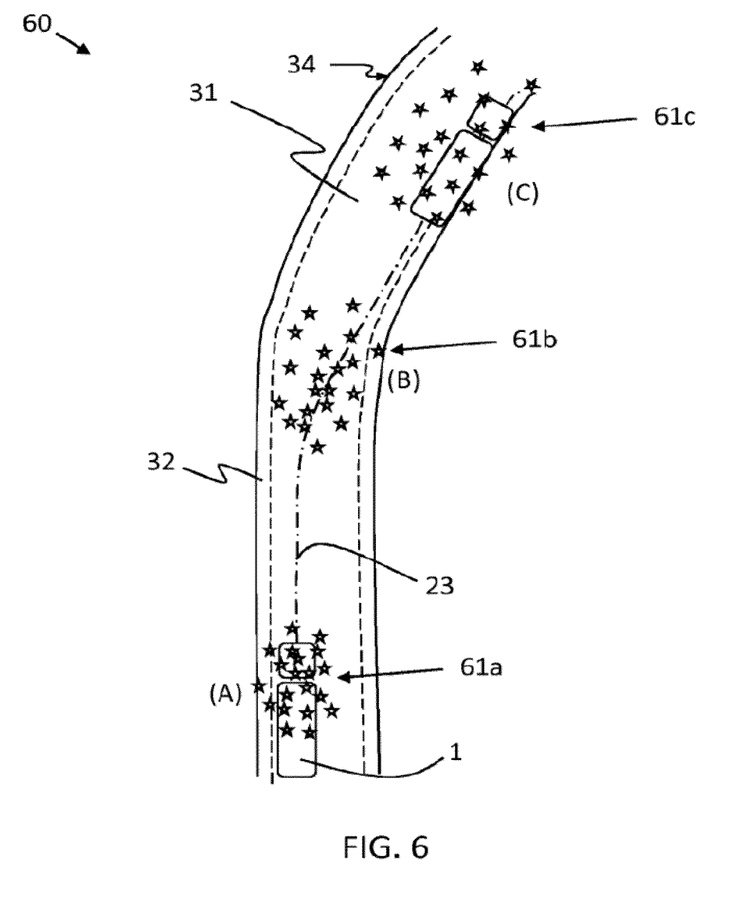

FIG. 6 illustrates another approach 60 to determining the potentially swept area. In FIG. 6, a particle filter is used where a large number of particles 61a, 61b, 61c represent possible realizations of a towing vehicle trying to follow the planned track 23. A realization of sensor input data is generated based on an assumed error distribution and fed to a simulated control algorithm which outputs an evolved state estimate of the articulated vehicle corresponding to a particle. This type of approach is often referred to as a Monte Carlo simulation approach.

Figure 7B:
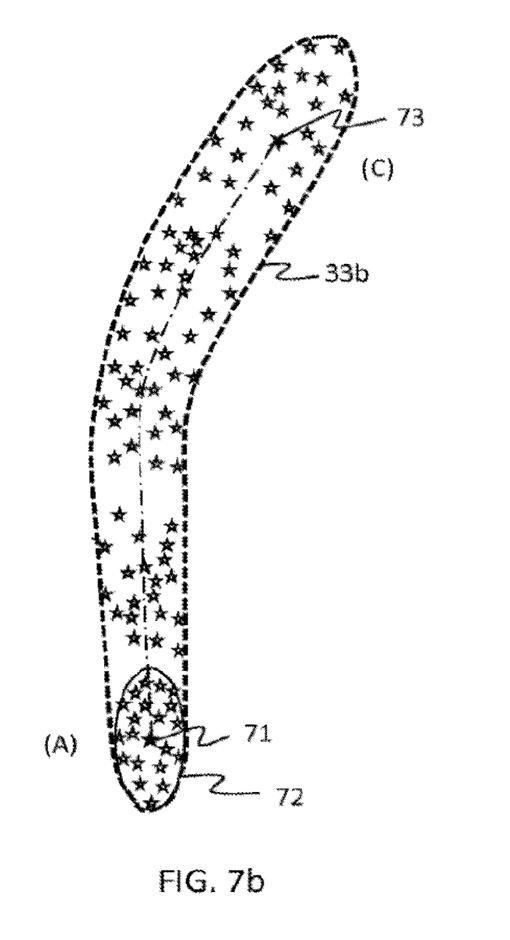

FIG. 7b illustrates how the potentially swept area 33b can be determined based on the swarm of particles. The track of each particle is used to determine a swept area corresponding to the particle as described in U.S. Pat. No. 9,862,413 B2 using information about the geometry of the articulated vehicle. The potentially swept area is then given by a bounding region 33b which comprises all swept areas of all particles. Optionally, outliers can be discarded in order to limit the potentially swept area to a more reasonably sized area.

To simplify, the potentially swept area can also be determined as the smallest region which comprises at least a given percentage of particles, e.g., 95% or particles.

As mentioned above, the herein disclosed techniques can also be used to safely control the articulated vehicle during the maneuver by constraining the vehicle state to lie within some allowable state space comprising also steering angle variables and the like. According to some such aspects, the vehicle state space comprises steering wheel angle, and the method comprises determining the allowable vehicle state space also based on a risk of roll-over associated with the planned track of the vehicle for the maneuver.

According to other such aspects, the method also comprises obtaining one or more dynamic properties associated with the vehicle 1. Determining the allowable vehicle state space based on the risk of roll-over is then also based on the vehicle dynamic properties. The vehicle dynamic properties may comprise, e.g., moments of inertia, mass center of gravity values, and the like associated with the articulated vehicle 1.

The result of the methods disclosed herein can be used during control of the vehicle to, e.g., automatically limit vehicle velocity in case the vehicle velocity goes above that of the allowable vehicle state space. Consequently, according to some aspects the methods disclosed herein comprise providing the determined allowable vehicle state space as an output to a control unit 900 of the vehicle 1 for control during the maneuver. Control units will be discussed in more detail below in connection to FIG. 9.

The potentially swept area may also be of use to a vehicle controller such as that discussed below in connection to FIG. 9. Thus, the methods disclosed herein may optionally comprise providing an estimate of the potentially swept area and/or a likelihood of roll-over during the maneuver as an output to a control unit 900 of the vehicle 1 for control during the maneuver.

Optionally, the method comprises determining a plurality of potentially swept areas corresponding to different sets of sensor input signal combinations and/or different maneuvers. Consequently, potentially swept areas and consequently also allowable vehicle state spaces may be determined for a plurality of different maneuvers, i.e., safe stop, obstacle avoidance, etc. Also, potentially swept areas and allowable vehicle state spaces may be determined for a plurality of different sensor outage scenarios, i.e., radar outage only, lidar and radar outage, total external sensor outage, etc.

In case high uncertainty is associated with the vehicle state space, i.e. the potentially swept area becomes large, the vehicle may be prepared for collision, and/or a warning signal may be triggered.

Figure 8:
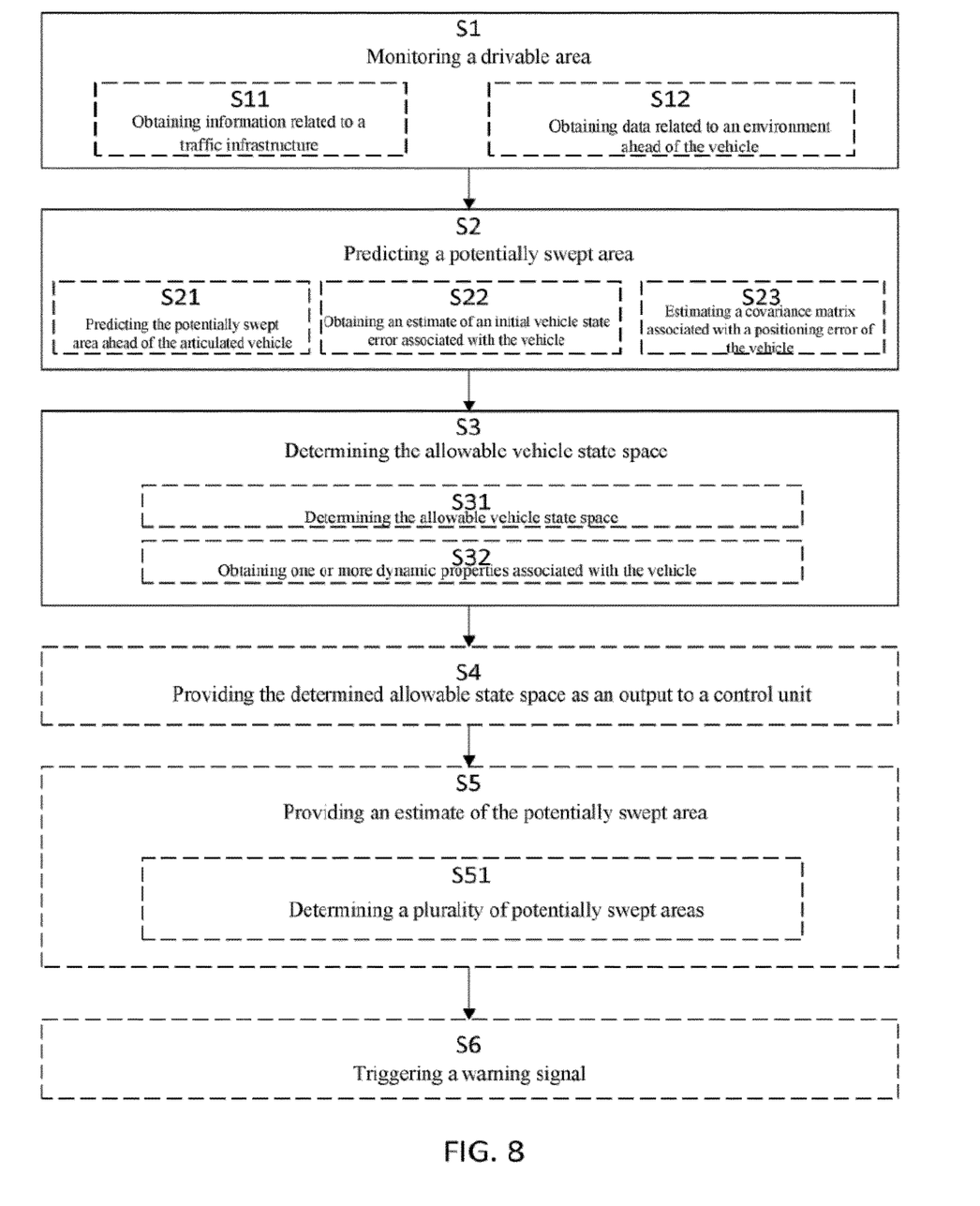
FIG. 8 is a flow chart illustrating methods.

FIG. 8 is a flow chart illustrating methods disclosed herein and which summarizes the above discussions. There is illustrated a method of determining an allowable vehicle state space of an articulated vehicle 1 for safely completing a maneuver, wherein the vehicle state space comprises vehicle velocity. The method comprises monitoring S1 a drivable area 33 ahead of the articulated vehicle 1 and predicting S2 a potentially swept area 33 ahead of the articulated vehicle 1. The potentially swept area 33 represents an area potentially traversed by the articulated vehicle 1 during the maneuver. It is determined based on an initial vehicle state, a geometry of the articulated vehicle 1, and on error characteristics associated with one or more sensor input signals used for positioning the vehicle 1. The method also comprises determining S3 the allowable vehicle state space such that the predicted potentially swept area 33 does not extend beyond the drivable area 31 ahead of the vehicle 1.

According to aspects, the maneuver is a safe stop maneuver, and the one or more sensor signals correspond to a reduced set of sensor input signals compared to a normal mode of operation.

According to aspects, the monitoring comprises obtaining S11 information related to a traffic infrastructure ahead of the vehicle 1.

According to aspects, the monitoring comprises obtaining S12 data related to an environment ahead of the vehicle 1 from any of; one or more radar sensors, one or more lidar sensors, one or more vision sensors, and one or more V2X communication transceivers.

According to aspects, the predicting comprises predicting S21 the potentially swept area 33 ahead of the articulated vehicle 1 based on a planned track of the vehicle for the maneuver.

According to aspects, the predicting comprises obtaining S22 an estimate of an initial vehicle state error associated with the vehicle 1.

According to aspects, the predicting comprises estimating S23 a covariance matrix associated with a positioning error of the vehicle 1 during the maneuver.

According to some aspects, the vehicle state space comprises steering wheel angle, and the method comprises determining S31 the allowable vehicle state space also based on a risk of roll-over associated with the planned track of the vehicle for the maneuver.

According to some such aspects, the method comprises obtaining S32 one or more dynamic properties associated with the vehicle 1 and determining the allowable vehicle state space based on risk of roll-over is based on the vehicle dynamic properties.

According to aspects, the method comprises providing S4 the determined allowable vehicle state space as an output to a control unit 900 of the vehicle 1 for control during the maneuver.

According to some aspects, the method comprises providing S5 an estimate of the potentially swept area and/or a likelihood of roll-over during the maneuver as an output to a control unit 900 of the vehicle 1 for control during the maneuver.

According to some such aspects, the method comprises determining S51 a plurality of potentially swept areas corresponding to different sets of sensor input signal combinations and/or different maneuvers.

According to aspects, the method comprises triggering a warning signal S6 based on an estimated uncertainty associated with an estimated state of the articulated vehicle 1.

Figure 9:
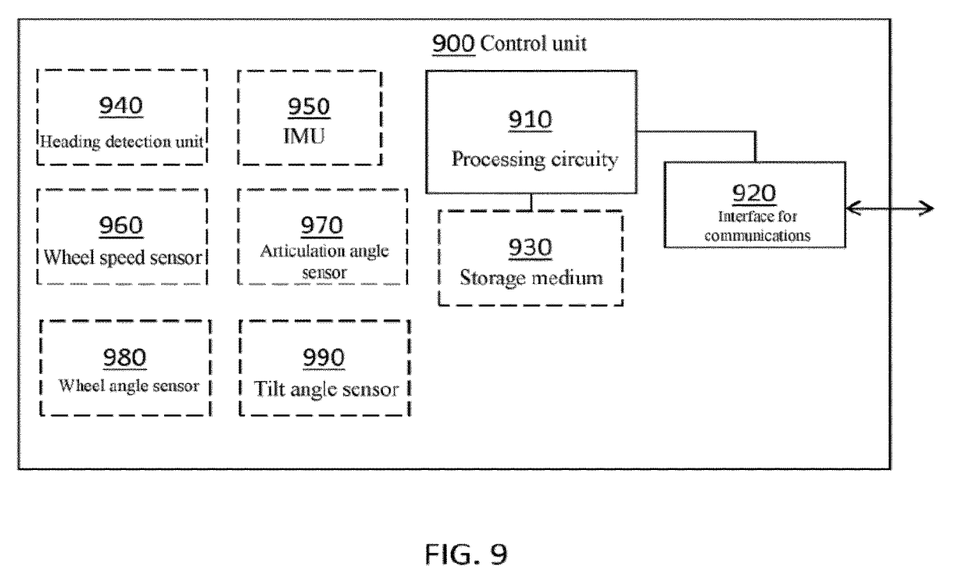
FIG. 9 schematically illustrates a sensor unit and/or a control unit.

FIG. 9 schematically illustrates, in terms of a number of functional units, the components of a control unit 900 according to embodiments of the discussions herein. This control unit 900 may be comprised in the articulated vehicle 1. Processing circuitry 910 is provided using any combination of one or more of a suitable central processing unit CPU, multiprocessor, microcontroller, digital signal processor DSP, etc., capable of executing software instructions stored in a computer program product, e.g. in the form of a storage medium 930. The processing circuitry 910 may further be provided as at least one application specific integrated circuit ASIC, or field programmable gate array FPGA.

Particularly, the processing circuitry 910 is configured to cause the control unit 900 to perform a set of operations, or steps, such as the methods discussed in connection to FIG. 8. For example, the storage medium 930 may store the set of operations, and the processing circuitry 910 may be configured to retrieve the set of operations from the storage medium 930 to cause the control unit 900 to perform the set of operations. The set of operations may be provided as a set of executable instructions. Thus, the processing circuitry 910 is thereby arranged to execute methods as herein disclosed.

The storage medium 930 may also comprise persistent storage, which, for example, can be any single one or combination of magnetic memory, optical memory, solid state memory or even remotely mounted memory.

The control unit 900 may further comprise an interface 920 for communications with at least one external device, such as the antenna array comprising the phase controllers and the mechanically rotatable base plate. As such the interface 920 may comprise one or more transmitters and receivers, comprising analogue and digital components and a suitable number of ports for wireline or wireless communication.

The processing circuitry 910 controls the general operation of the control unit 900, e.g., by sending data and control signals to the interface 920 and the storage medium 930, by receiving data and reports from the interface 920, and by retrieving data and instructions from the storage medium 930. Other components, as well as the related functionality, of the control node are omitted in order not to obscure the concepts presented herein.

The control unit optionally comprises a heading detection unit 940, such as a compass or GPS module. The control unit may also comprise any of an IMU 950, a wheel speed sensor 960, and an articulation angle sensor 970. A wheel angle sensor 980 and/or a vehicle tilt angle sensor 990 may optionally also be provided.

Figure 10:
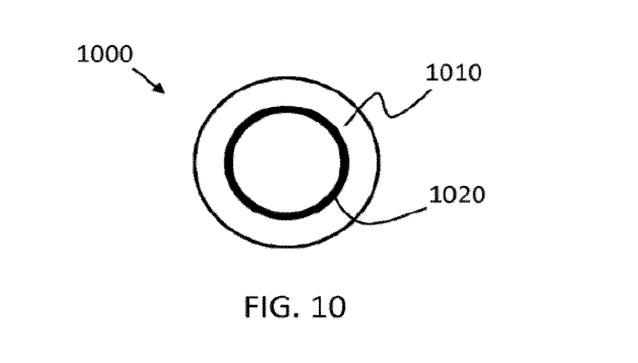
FIG. 10 shows an example computer program product.

FIG. 10 illustrates a computer readable medium 1010 carrying a computer program comprising program code means 1020 for performing the methods illustrated in FIG. 8, when said program product is run on a computer. The computer readable medium and the code means may together form a computer program product 1000.

The invention claimed is:

1. A computer implemented method of determining an allowable vehicle state space of an articulated vehicle for safely completing a safe stop maneuver, wherein the allowable vehicle state space defines a part of a vehicle state space such that the allowable vehicle state space only comprises states from which the maneuver can be safely completed, wherein the allowable vehicle state space comprises a maximum steering wheel angle and a maximum vehicle velocity for safely completing the safe stop maneuver,
wherein the vehicle state space comprises steering wheel angle and vehicle velocity, the method comprising;
monitoring a drivable area ahead of the articulated vehicle based on one or more sensor input signals used for positioning the articulated vehicle, wherein the one or more sensor input signals correspond to a normal mode of sensor operation, wherein the drivable area is calculated in part based on a type of the articulated vehicle,
predicting based on one or more sensor input signals corresponding to the normal mode of sensor operation, a potentially swept area ahead of the articulated vehicle and a likelihood of roll-over, wherein the potentially swept area is, for a potentially upcoming scenario where outage is experienced for at least one of the sensor input signals,
wherein the predicting comprises identifying a matrix of state vectors comprising position, velocity, and acceleration components,
wherein the different components in the matrix of state vectors are given different priorities or weights when deciding on actions and control decisions,
wherein the potentially swept area represents an area that may be traversed by the articulated vehicle during the safe stop maneuver with a probability, based on an initial vehicle state of the articulated vehicle, a geometry of the articulated vehicle, and on error characteristics associated with the one or more sensor input signals wherein the one or more sensor signals correspond to a reduced set of sensor input signals compared to a normal mode of operation, wherein the potentially upcoming scenario is represented by the error characteristics,
determining the allowable vehicle state space such that the associated predicted potentially swept area does not extend beyond the drivable area ahead of the vehicle and such that the associated likelihood of roll-over is negligible,
controlling the vehicle velocity to not exceed the maximum vehicle velocity as specified by the determined allowable vehicle state space, and
during execution of the safe stop maneuver, limiting the steering wheel angle to not exceed the maximum steering wheel angle as specified by the determined allowable vehicle state space,
and performing the safe stop maneuver.

2. The computer implemented method according to claim 1, wherein the maneuver is a safe stop maneuver.

3. The computer implemented method according to claim 1, wherein the monitoring comprises obtaining information related to a traffic infrastructure ahead of the articulated vehicle.

4. The computer implemented method according to claim 1, wherein the monitoring comprises obtaining data related to an environment ahead of the vehicle from any of; one or more radar sensors, one or more lidar sensors, one or more vision sensors, and one or more V2X communication transceivers.

5. The computer implemented method according to claim 1, wherein the predicting comprises predicting the potentially swept area ahead of the articulated vehicle based on a planned track T associated with the maneuver.

6. The computer implemented method according to claim 1, wherein the predicting comprises obtaining an estimate of an initial vehicle state error associated with the articulated vehicle.

7. The computer implemented method according to claim 1, wherein the predicting comprises estimating a covariance matrix associated with a positioning error of the articulated vehicle during the maneuver.

8. The computer implemented method according to claim 1, wherein the vehicle state space comprises steering wheel angle, and wherein the method comprises determining the allowable vehicle state space also based on a risk of roll-over associated with the planned track of the articulated vehicle associated with the maneuver.

9. The computer implemented method according to claim 8, comprising obtaining one or more dynamic properties associated with the vehicle, wherein determining the allowable vehicle state space based on risk of roll-over is based on the vehicle dynamic properties.

10. The computer implemented method according to claim 1, comprising providing the determined allowable vehicle state space as an output to a processor of a control unit of the vehicle for control during the maneuver.

11. The computer implemented method according to claim 1, comprising providing an estimate of the potentially swept area and/or a likelihood of roll-over during the maneuver as an output to a processor of a control unit of the vehicle for control during the maneuver.

12. The computer implemented method according to claim 11, comprising determining a plurality of potentially swept areas corresponding to different sets of sensor input signal combinations and/or corresponding to different maneuvers.

13. The computer implemented method according to claim 1, comprising triggering a warning signal based on an estimated uncertainty associated with an estimated vehicle state of the articulated vehicle.

14. A non-transitory computer readable medium carrying a computer program comprising program code means for performing the steps of claim 1 when said program product is run on a computer or on a central processing unit.

15. A processor of a control unit for determining an allowable vehicle state space of an articulated vehicle, the processor being configured to perform the steps of the method according to claim 1.

16. A vehicle comprising a processor according to claim 15.

\* \* \* \* \*